United States Patent [19]

Eisenlohr

[11] 3,924,900
[45] Dec. 9, 1975

[54] FEED MECHANISM FOR PNEUMATIC CONVEYOR SYSTEMS

[75] Inventor: Gerald Mason Eisenlohr, Richmond, Va.

[73] Assignee: AMF Incorporated, White Plains, N.Y.

[22] Filed: July 10, 1974

[21] Appl. No.: 487,116

[52] U.S. Cl. .................................. 302/49; 302/2 R
[51] Int. Cl.² ........................................ B65G 53/46
[58] Field of Search .......... 221/211, 234, 277, 288; 222/194; 302/2 R, 49

[56] References Cited
UNITED STATES PATENTS

| | | | |
|---|---|---|---|
| 1,069,083 | 7/1913 | Gibson | 302/49 X |
| 1,220,684 | 3/1917 | Ray | 221/234 |
| 1,741,033 | 12/1929 | Neidlinger | 221/277 X |
| 2,740,672 | 4/1956 | Morrow | 302/49 |
| 3,393,591 | 7/1968 | Rakowicz | 302/2 R X |
| 3,399,931 | 9/1968 | Vogt | 302/49 |
| 3,827,757 | 8/1974 | Heitmann et al. | 302/49 |

FOREIGN PATENTS OR APPLICATIONS 1,075,520   2/1960   Germany ..................... 302/49

Primary Examiner—Richard A. Schacher
Assistant Examiner—Jeffrey V. Nase
Attorney, Agent, or Firm—George W. Price; Charles J. Worth

[57] ABSTRACT

A mechanism for feeding rod-like articles into a pneumatic conveyor system, comprising rotatable drum means provided with a vacuum assist for receiving rod-like articles from a reservoir and delivering the articles one by one to a fixed receiver chamber within the drum means and connected to the conveyor system; and the receiver chamber being connected to a source of pressure air for propelling the article from the chamber into the conveyor system while providing a source of pressure air for the system.

10 Claims, 10 Drawing Figures

FEED MECHANISM FOR PNEUMATIC CONVEYOR SYSTEMS

This invention relates generally to pneumatic conveyor systems and more particularly to feed mechanisms therefor.

Pneumatic systems are used for conveying a large variety of articles. Because articles being conveyed are enclosed and are not mechanically held, such systems are considered to be particularly suitable for conveying fragile articles.

Heretofore, difficulty has been encountered in feeding articles into a pressurized pneumatic conveying line and providing a pressurized air supply at such a point of origin. Such problems are substantially amplified when the articles to be conveyed are elongated or rod-like and are made of a fragile material.

While the present invention can be used for feeding various articles including rod-like articles to a pneumatic conveying system, it is particularly adapted to handle filter plugs for making filter tip cigarettes. A filter plug of the type concerned is a formed rod of a porous fibrous mass generally 4 to 6 inches in length and roughly just under 5/16 of an inch in diameter. The plug is cut into a plurality of segments, usually 4 to 6 in number, and each segment is attached by an overwrap to the end of a cigarette. Because of the length of such plugs they can easily become cocked or misaligned and because of the material they can be easily bent, distorted, broken or crushed.

Accordingly, an object of the present invention is to provide means for feeding rod-like articles one after the other from a supply to a pneumatic conveyor system.

Another object of the present invention is to provide the foregoing means which forms a pressurized air supply at the point of origin of the articles to be conveyed.

And another object of the present invention is to provide means for feeding rod-like articles one after the other from a supply to a pneumatic conveyor system which maintains such articles axially oriented to prevent damage thereto.

Still another object of the present invention is to provide the foregoing means having rotatable drum members transferring articles from the supply to a stationary chamber from which they are propelled into the conveyor system.

The present invention contemplates a mechanism for feeding rod-like articles to a pneumatic conveyor system, comprising a rotatably driven drum having a plurality of axial pockets for receiving rod-like articles, a receiver fixedly disposed within the drum and providing the pockets with a vacuum assist for receiving the rodlike articles, the receiver having a chamber open at the periphery and connected at its ends to a source of pressure air and the conveyor system, and cam means rotatably driven in timed relationship with the drum for urging rod-like articles to move laterally from the pockets into the receiver chamber when a pocket is aligned adjacent the chamber.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

Figure 1:
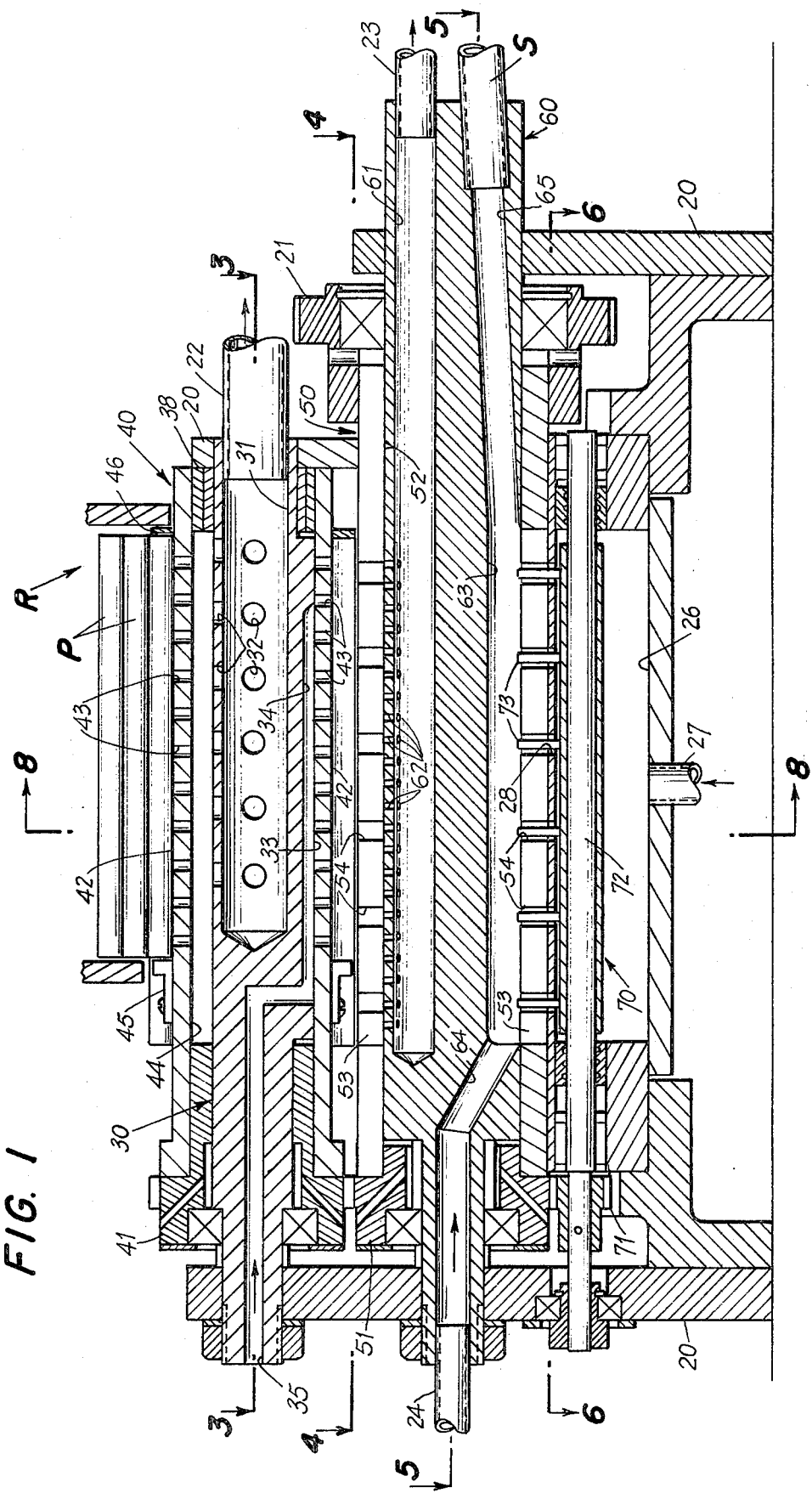
FIG. 1 is a vertical sectional view of a feed mechanism made in accordance with the present invention.
Figure 5:
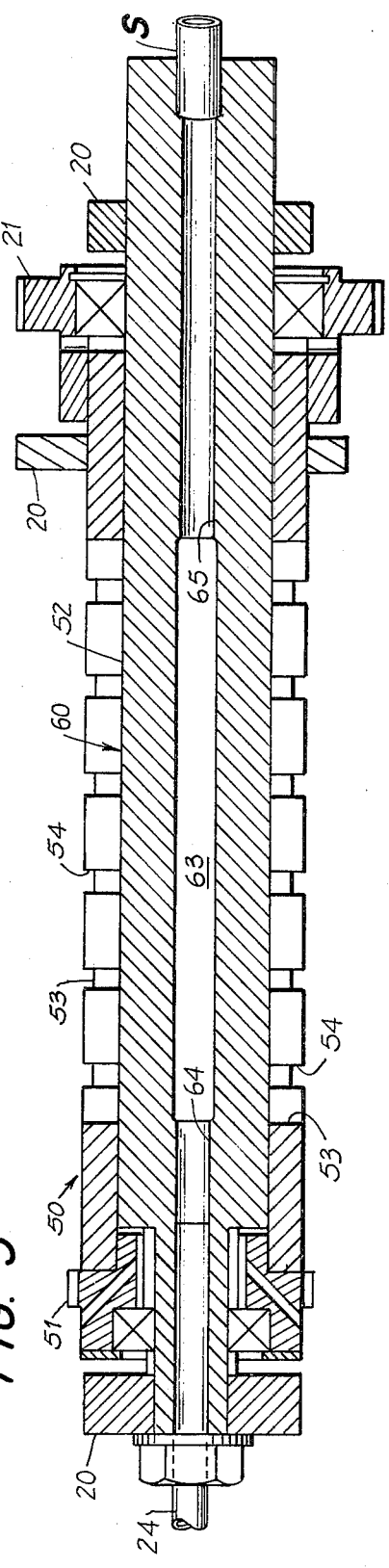
Figure 6:
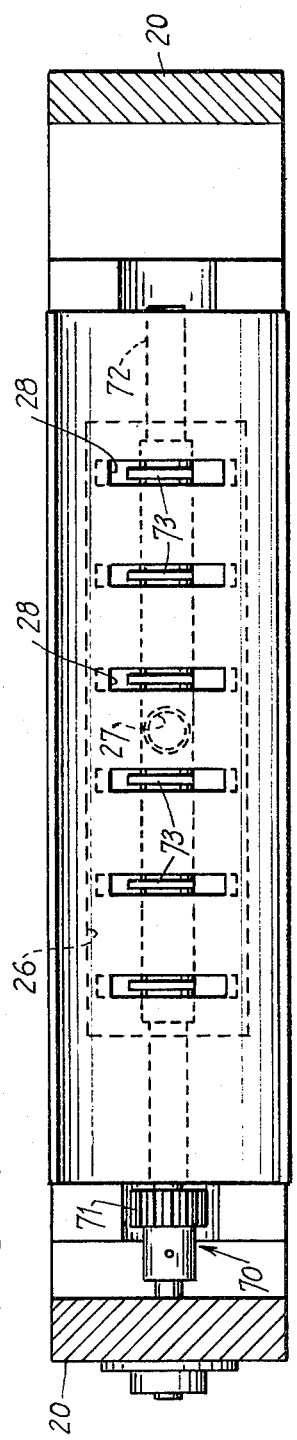

FIGS. 5 and 6 are sectional views taken on lines 5—5 and 6—6, respectively of FIG. 1.

Figure 7:
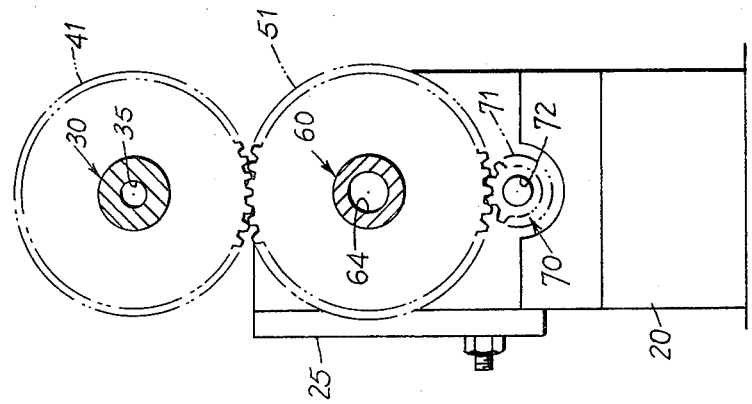

FIG. 7 is an end elevational view of the timing gear interlock of the novel feed mechanism.

Figure 8:
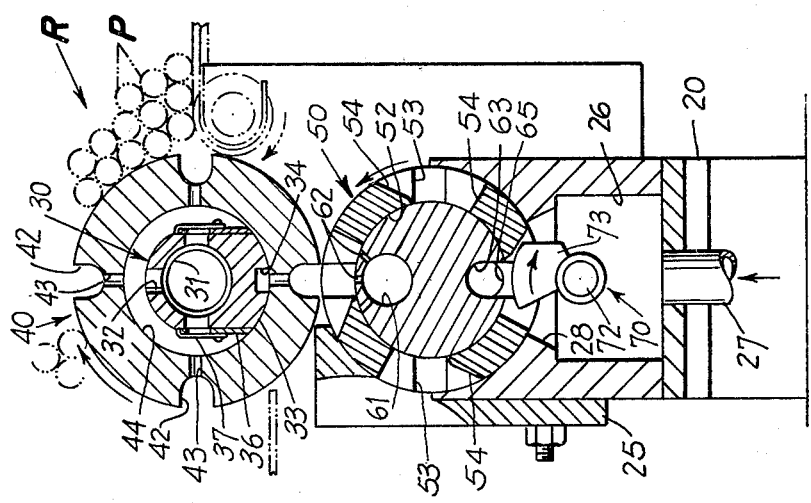

FIG. 8 is a sectional view taken on line 8—8 of FIG. 1.

Figure 9:
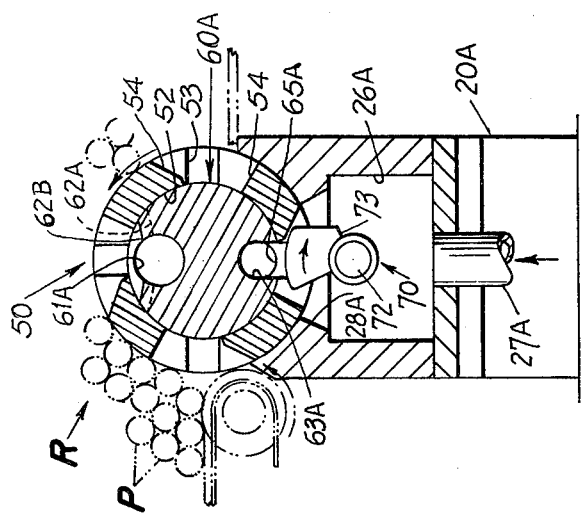

FIG. 9 is a sectional view, similar to FIG. 8, of a modified feed mechanism.

Figure 10:
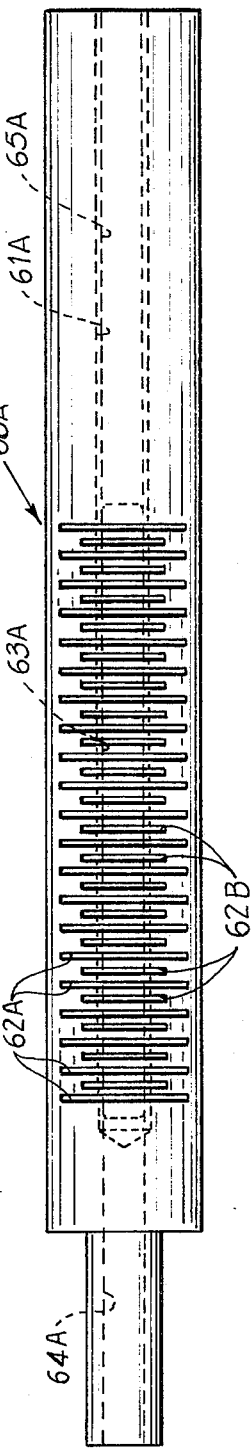

FIG. 10 is a plan view of a modified fixed receiver.

Referring now to the drawings and particularly to FIGS. 1, 7 and 8, the novel feed mechanism generally is provided with a rotatable catcher or pickup drum 40 for receiving filter plugs P one by one from a reservoir R with the usual refuser means as shown. A rotatable transfer drum 50, disposed adjacent and parallel to the catcher drum 40, is driven by means (not shown) through an input gear 21 and is connected by gears 51 and 41 to drive the drum 40. The transfer drum 50 which encircles or rotates on a fixed receiver 60, receives filter plugs P from the catcher drum 40 and delivers the plugs to a chamber 63 from where they are driven or propelled by compressed or pressure air into the conveyor system shown in part by tube S. A camming device 70, rotatably driven in timed relationship with the drum 50 by a gear 71 in mesh with the gear 51, causes the filter plugs P to move into the chamber 63 from the transfer drum 50. It should be readily seen that the timing gears 51, 41 and 71 drivingly interconnect the catcher drum 40, the transfer drum 50 and the camming device 70 to rotate in appropriately timed relationship to feed filter plugs P, one after the other, from the reservoir R to the receiver chamber 63 from where they are fed by pressure air into the conveyor system S.

Figure 2:
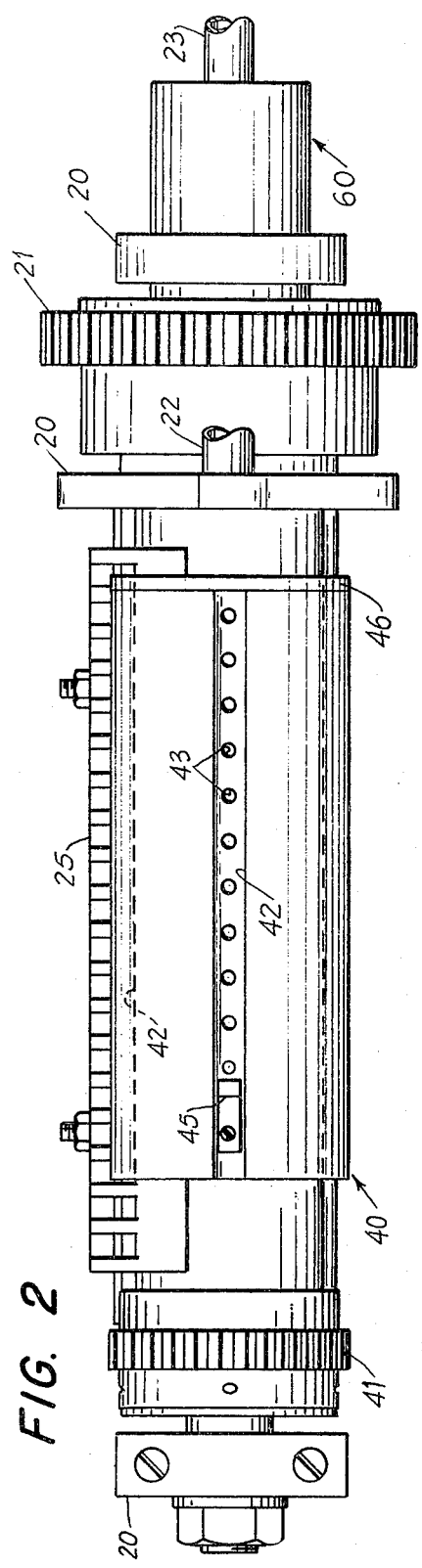
FIG. 2 is a plan view of the novel mechanism of FIG. 1.
Figure 3:
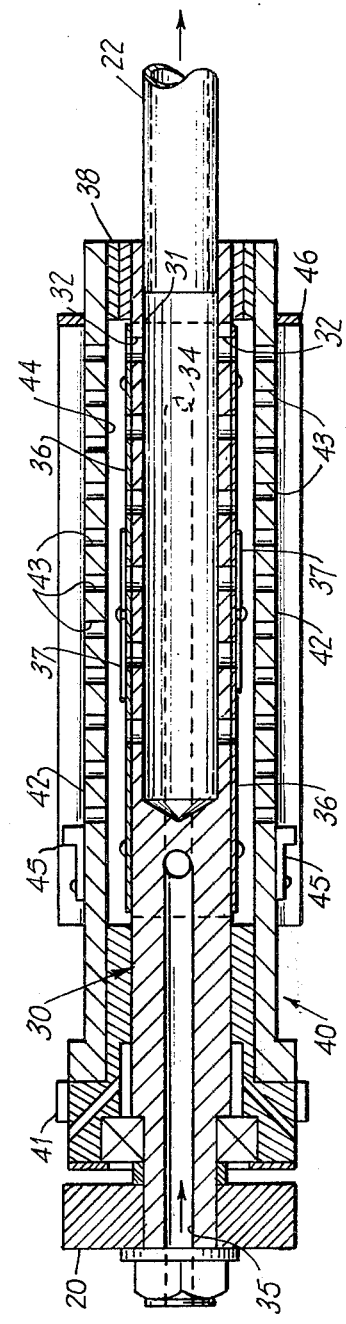
FIG. 3 is a sectional view taken on line 3—3 of FIG. 1.
Figure 4:
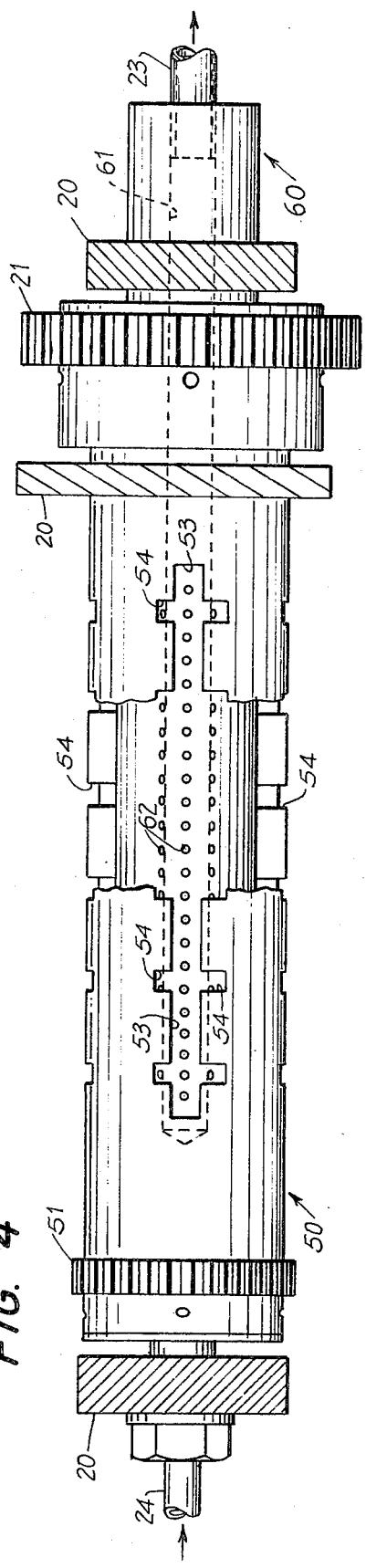
FIG. 4 is a plan view of the transfer portion of the novel feed mechanism taken along line 4—4 of FIG. 1.

Referring also to FIGS. 2 and 3, an air distributor 30 is fixedly supported at its ends by a frame 20 of the novel feed device and is encircled by the catcher drum 40 forming therebetween a suction or vacuum chamber 44 which is closed at one end by the gear 41 and at its other end by a sealing bushing 38. The sides of the distributor 30 are flat and are connected by an arcuate seal face 33 which engages the inner surface of the catcher drum 40 and limits the arcuate extent of the formed chamber 44. The distributor 30 is provided with a blind axial bore 31 connected at its open end by a conduit 22 to a source of suction or vacuum, and a plurality of arcuately spaced series of axially spaced ports 32 which flow connect the bore 31 and the formed chamber 44. The seal face 33 is provided with an axial groove 34 connected, through the other end of the distributor 30 opposite from the conduit 22, by an L-shaped passage 35 to a source of pressure air. To help prevent blowby of pressure from the groove 34 across the seal face 33 to the formed vacuum chamber 44, each flat side of the distributor 30 is provided with a plate seal 36 biased by a spring 37 to engage the inner surface of the catcher drum 40. The plate seals 36 are provided with openings which correspond to and register with the ports 32 in the sides of the distributor, as is best shown in FIGS. 3 and 8.

The catcher drum 40 is provided with a plurality of axial flutes or pockets 42 which are equally spaced arcuately from one another. Each of the flutes 42 has a series of axially spaced through ports 43 providing the flutes with flow connections to the inside of the drum 40. An adjustable stop 45 to limit axial movement of plugs P is provided in one end of each flute 42 while the other end is preferably closed by a ring 46. As the catcher drum 40 rotates (clockwise in FIG. 8), the flutes 42 registering with the reservoir R are provided with a suction or vacuum assist through ports 43, the formed chamber 44, ports 32, blind bore 31 and suction tube 22 to pick up or receive filter plugs P. Similarly, the passage 35 and axial groove 34 provides air pressure to a flute 42 through its ports 43 when the flute is positioned to transfer a filter plug P to the transfer drum 50.

Referring now to FIGS. 1, 4, 5, 7 and 8, the transfer drum 50, disposed adjacent and parallel to the catcher drum 40, is provided with a circular inner surface 52 which engages the outer periphery of the receiver 60 to form an interface on which the transfer drum rotates. The gear 21 at one end of the transfer drum 50 is adapted for connection to driving means (not shown) while the gear 51 at the other end meshes with the gear 41 causing the catcher and transfer drums 40 and 50 to rotate in timed unison. The transfer drum 50 is provided with a plurality of axial or longitudinal slots 53 equally spaced arcuately from one another, each being closed at the bottom by the receiver 60 to form a pocket to receive filter plugs P.

The catcher drum 40 with its pockets or flutes 42 and the transfer drum 50 with its pockets or slots 53 are so arranged and rotate at equal speeds so that pairs of pockets 42 and 53 move, one after the other, into face to face alignment at which time a filter plug P disposed in the pocket 42 will be transferred to the aligned pocket 53. As previously disposed, pressure air from the axial groove 34 is provided through ports 43 to urge the filter plug P out of a pocket 42, and vacuum or suction is provided at this time to urge the filter plug P into the aligned pocket 53. To provide this vacuum or suction, the receiver 60 has a blind bore 61 connected at its open end by a tube 23 to a vacuum or suction source and is provided with a plurality of ports 62 which communicate with a pocket 53 positioned to receive a filter plug P from an aligned pocket 42. The ports 62 are preferably disposed in three arcuately spaced series of axially spaced ports. The actual numbers of ports and spaced series of ports will be determined by the requirements of the novel mechanism and the numbers disclosed herein are not to be construed as defining the limits of the present invention.

Diametrically opposite from the blind bore 61 the fixed receiver 60 is provided with an axially or longitudinal recess or slot 63 in its periphery. The slot 63 forms a fixed receiver chamber which is connected at one end by a passage 64 and a conduit 24 to a source of pressure air, and at its other end by a passage 65 to the pneumatic conveyor system S. The rotatable cam means 70 is timed to urge a filter plug P from a pocket 53 inwardly into the fixed receiver chamber 63 each time such a pocket is rotated into face to face relationship or alignment with the receiver chamber. As best shown in FIGS. 2, 7 and 8, the frame 20 is provided with a ported cheek plate 25 which vents pockets 53 as they rotate out of alignment with pockets 42 and into alignment with the receiver chamber 63. At the same time, the plate 25 prevents filter plugs P from falling out of the pockets 53 being vented.

The cam means 70 is disposed in a chamber 26 at the bottom of the frame 20, and has a shaft 72 which is supported in the ends of the chamber 26 and is provided with gear 51. A plurality of cams or cam arms 73, disposed in spaced series, extend radially outwardly from the shaft 70. The upper wall of the chamber 26 is provided with a spaced series of slots 28 for passage of the cams 73. A series of transverse slots 54, corresponding to the slots 28 are provided across each of the axial or longitudinal slots or pockets 53 forming aligned recesses in the side walls thereof.

In addition to pressure air provided by the conduit 24 and passage 64 to the receiver chamber 63, conduit 27 provides pressure air to the casing chamber 26 in which the rotatable cam 70 is housed. When a longitudinal slot or pocket 53 is aligned with the receiver chamber 63, the lateral slots 28 of the chamber 26 and the lateral slots or aligned recesses 54 of the aligned pocket provide communication or a flow path from casing chamber 26 to the receiver 63 which tends to cause the filter plug P to float and helps or assists the rotatable cam 70 move the filter plug laterally into position in the chamber 63 to be propelled into the conveyor system S.

It should now be understood that negative (suction or vacuum) and/or positive pressure air assist is provided the rotatable drum means (catcher drum 40 and transfer drum 50) when a filter plug P is received from the reservoir R, is transferred from drum 40 to drum 50 and when discharged into the receiver chamber 63. It also should be readily seen that the novel feed mechanism provides the source of pressure air for the conveyor system S as well as the source of the rod-like articles to be conveyed.

A modified feed mechanism is shown in FIG. 9 which is provided with a modified receiver 60A as shown also in FIG. 10 and which can be used in place of the receiver 60 in the feed mechanism of FIGS. 1 to 8. The modified receiver 60A is provided with a receiver chamber 63A having pressure air and conveyor system connections 64A and 65A which correspond to the chamber 63 and connections 64 and 65 of the receiver 60. A blind bore 61A, corresponding to the blind bore 61, is provided for connection to suction or vacuum by the conduit 23. However, in lieu of the multiple series of spaced ports 62, the modified receiver is provided with an axially spaced series of alternately large slots 62A and small slots 62B, as shown in FIG. 10.

The catcher drum 40 and the fixed air distributor 30 of the feed mechanism for the transfer drum or rotatable drum means 50 of FIGS. 1 to 8 are eliminated from the modified feed mechanism as shown in FIG. 9. In this arrangement, the transfer drum or rotatable drum means 50 which rotates on the receiver 60A (or 60) extends upwardly into the reservoir R to pick up filter plugs P therefrom. The receiver 60A is fixedly supported by a modified frame 20A provided with a chamber 26A with a pressure air inlet 27A and slots 28A corresponding to chamber 26, inlet 27 and slots 28 of frame 20.

Vacuum or suction from the blind bore 61A through the slots 62A and 62B provide the vacuum assist to pick up filter plugs P from the reservoir R.

Although several embodiments of the invention have been illustrated and described in detail, it is to be expressly understood that the invention is not limited thereto. Various changes may be made in the design and arrangement of the parts without departing from the spirit and scope of the invention as the same will now be understood by those skilled in the art.

I claim:

1. A mechanism for feeding rod-like articles to a pneumatic conveyor, comprising rotatable drum means for receiving rodlike articles moving laterally to their axes into said drum means one by one from a reservoir, receiver means being disposed within said drum means and supported at its ends against movement, said receiver means being provided with a longitudinal recess in its periphery forming a fixed receiver chamber and passage means for connecting one end of said chamber to a pneumatic conveyor and the other end of said chamber to a source of pressure air for causing rod-like articles to move axially out of said chamber into the conveyor, said drum means rotating relative to said receiver means thereby moving each of said articles into alignment adjacent said receiver chamber with the axis of the aligned article parallel to the axis of said receiver chamber, and cam means connected to rotate in timed relation with said drum means and urging a rod-like article to move laterally to its axis into said receiver within said drum means each time said drum means moves a rodlike article into alignment with said receiver chamber.

2. The mechanism in accordance with claim 1, further comprising means within said drum means for providing suction to assist said drum means to receive rodlike articles from the reservoir.

3. The mechanism in accordance with claim 1, further comprising means providing pressure air to the outside of said drum means adjacent said cam means causing a rod-like article adjacent said receiver to float and assist said cam means in moving the rod-like article laterally into said receiver chamber.

4. The mechanism in accordance with claim 3, and said receiver means comprising a receiver member supported at its ends against movement and being provided with said receiver chamber having said passage means at the ends thereof and with a blind axial bore adapted for connection to a source of vacuum, said drum means comprising a transfer drum rotatable on said receiver member and provided with a plurality of longitudinal slots equally spaced arcuately one from another for receiving rod-like members, said slots being moved one after the other to a position to receive a rod-like article and then into alignment with said receiver chamber by rotation of said transfer member, and said blind axial bore being provided with port means forming a flow connection with said longitudinal slots when each of said slots is positioned to receive a rod-like article.

5. The mechanism in accordance with claim 4, and said rotatable drum means further comprising another rotatable drum disposed adjacent and parallel to said transfer drum and provided with a plurality of longitudinal pockets equally spaced arcuately one from the other for receiving rod-like articles from a source, means connecting said transfer and other drums for rotation in timed relationship moving said longitudinal pockets progressively into face to face alignment each with a different one of said slots for transferring rod-like articles one by one from said other drum to said transfer drum.

6. The mechanism in accordance with claim 5, and means disposed within said other drum providing suction and pressure air, and each of said pockets having a series of spaced ports through the bottom thereof communicating with suction when said pocket is positioned to receive a rod-like article and communicating with pressure air when in face to face alignment with one of said slots.

7. The mechanism in accordance with claim 6, further comprising an air distributor disposed within said other drum and supported at its ends against movement, said air distributor being spaced inwardly from said other drum defining therebetween a vacuum chamber and having a pair of flat sidewalls with a seal face therebetween engaging the inside of said other drum and defining the arcuate extent of said vacuum chamber, said seal face having an axial groove in its surface aligned to communicate with the ports of said pockets when in face to face alignment with said slots, and said air distributor having a passage means through each of its ends one for connecting said vacuum chamber to a source of vacuum and the other for connecting said groove to a source of pressure air.

8. The mechanism in accordance with claim 7, further comprising a cam chamber disposed adjacent to said transfer drum and provided with means for connection to a source of pressure air, said cam means comprising a shaft rotatably supported by the ends of said chamber and a plurality of cam arms spaced axially along said shaft, said cam chamber having a wall disposed between said transfer drum and said cam shaft, said wall having a plurality of spaced slots each aligned with a different one of said cam arms for passage thereof and pressure air for causing a rod-like article to float as it is moved by said cam means into said receiver chamber, and each of said longitudinal slots having a plurality of aligned pairs of recesses in its longitudinal walls each aligned pair of recesses being aligned with a different one of said slots in the wall of said cam chamber.

9. A mechanism for feeding rod-like articles to a pneumatic conveyor, comprising rotatable drum means for receiving rod-like articles one by one from a reservoir and moving such articles laterally to their axes into alignment adjacent to a receiver chamber, fixed receiver means disposed within said drum means and having an axial slot in its surface forming said receiver chamber and passage means for connecting one end of said chamber to a pneumatic conveyor and the other end of said chamber to a source of pressure air for propelling rod-like articles axially from said chamber, and means for engaging and moving rod-like articles laterally to their axes from said drum means into said receiver chamber each time a rod-like article is moved into alignment with said chamber by said drum means 10. The mechanism in accordance with claim 9, and means for providing vacuum to assist said drum means for receiving rod-like articles and means for providing pressure air to cause rod-like articles to float as they are moved into said receiver chamber.

* * * * *